(12) United States Patent
Desnoyers

(10) Patent No.: US 10,376,000 B2
(45) Date of Patent: Aug. 13, 2019

(54) FLEXIBLE MODULAR ABSORPTION PANEL AND BLOCK FOR PRODUCING SUCH A PANEL

(71) Applicant: HOLDIPROTEC, Paris (FR)

(72) Inventor: Stephane Desnoyers, Paris (FR)

(73) Assignee: HOLDIPROTEC, Ferrieres Saint Hilaire (FR)

( * ) Notice: Subject to any disclaimer, the term of this patent is extended or adjusted under 35 U.S.C. 154(b) by 476 days.

(21) Appl. No.: 15/556,791

(22) PCT Filed: Nov. 19, 2013

(86) PCT No.: PCT/EP2013/074164
§ 371 (c)(1),
(2) Date: Sep. 8, 2017

(87) PCT Pub. No.: WO2014/079839
PCT Pub. Date: May 30, 2014

(65) Prior Publication Data
US 2018/0055102 A1    Mar. 1, 2018

(30) Foreign Application Priority Data
Nov. 23, 2012 (FR) ...................... 12 61151

(51) Int. Cl.
*A41D 13/015* (2006.01)
*A41D 31/00* (2019.01)
(Continued)

(52) U.S. Cl.
CPC ....... *A41D 13/015* (2013.01); *A41D 13/0153* (2013.01); *A41D 13/0156* (2013.01);
(Continued)

(58) Field of Classification Search
CPC ............ A41D 31/0044; A41D 13/0156; A41D 13/0158; A41D 2600/10; A41D 13/105;
(Continued)

(56) References Cited

U.S. PATENT DOCUMENTS 3,251,076 A * 5/1966 Burke ..................... F16F 1/376
188/268
3,863,909 A * 2/1975 Weber ................... F16F 3/0876
267/140
(Continued)

OTHER PUBLICATIONS

International Search Report, dated Feb. 11, 2014, from corresponding PCT/EP2013/074164 application.

*Primary Examiner* — Thomas J Williams
*Assistant Examiner* — Mariano Sy
(74) *Attorney, Agent, or Firm* — Young & Thompson

(57) ABSTRACT

Disclosed is a panel that is produced by assembling a plurality of adjacent individual absorption blocks; each block in the panel is in the shape of a polyhedral pyramid frustum, of which the base is a regular six-sided polygon; each individual block including six lateral walls surrounded by a lower peripheral lip of which each section is provided with a complementary tenon or a mortise arranged so as to allow two adjacent individual blocks to be assembled, in particular by engagement, in the vertical direction, of a tenon and a mortise belonging respectively to one and the other of the two adjacent individual blocks.

20 Claims, 4 Drawing Sheets

(51) Int. Cl.
　　*A63B 71/08*　　　(2006.01)
　　*F16F 1/36*　　　　(2006.01)
　　*F16F 1/371*　　　(2006.01)
　　*F16F 1/373*　　　(2006.01)
　　*F16F 3/087*　　　(2006.01)

(52) U.S. Cl.
　　CPC ..... *A41D 13/0158* (2013.01); *A41D 31/0044* (2013.01); *A63B 71/08* (2013.01); *F16F 1/3605* (2013.01); *F16F 1/371* (2013.01); *F16F 1/373* (2013.01); *F16F 3/0876* (2013.01); *A41D 2600/10* (2013.01); *A41D 2600/102* (2013.01); *F16F 2226/04* (2013.01); *F16F 2230/02* (2013.01); *F16F 2230/32* (2013.01)

(58) Field of Classification Search
　　CPC ........... A41D 13/0153; A41D 2600/102; F16F 1/371; F16F 3/0876; F16F 1/373; F16F 1/3605; F16F 2230/02; F16F 2230/32; F16F 2226/04
　　USPC ..... 267/141–143, 122; 188/371, 377; 2/414, 2/425, 455
　　See application file for complete search history.

(56) References Cited

U.S. PATENT DOCUMENTS

| | | | | |
|---|---|---|---|---|
| 4,483,020 | A | | 11/1984 | Dunn |
| 5,016,417 | A | * | 5/1991 | Mentken ................. E04C 2/405 52/571 |
| 5,030,501 | A | * | 7/1991 | Colvin ................. B65D 65/406 428/178 |
| 6,085,878 | A | * | 7/2000 | Araki ...................... F16F 7/121 188/371 |
| 6,682,128 | B2 | * | 1/2004 | Carroll, III ............. A62B 1/22 296/187.03 |
| 7,458,172 | B2 | * | 12/2008 | Aveni ................... A43B 13/183 267/144 |
| 7,673,351 | B2 | * | 3/2010 | Copeland ............. A41D 31/005 2/425 |
| 8,366,985 | B2 | * | 2/2013 | Kim ........................ E02B 3/14 249/10 |
| 8,726,424 | B2 | * | 5/2014 | Thomas ................. A42B 3/124 2/414 |
| 9,474,313 | B2 | * | 10/2016 | Kamradt ................ F16F 3/093 |
| 2002/0017805 | A1 | * | 2/2002 | Carroll, III ............. A62B 1/22 296/187.03 |
| 2010/0258988 | A1 | * | 10/2010 | Darnell ................. A42B 3/064 267/141 |
| 2011/0296594 | A1 | | 12/2011 | Thomas et al. |
| 2012/0198594 | A1 | | 8/2012 | Reay |

* cited by examiner

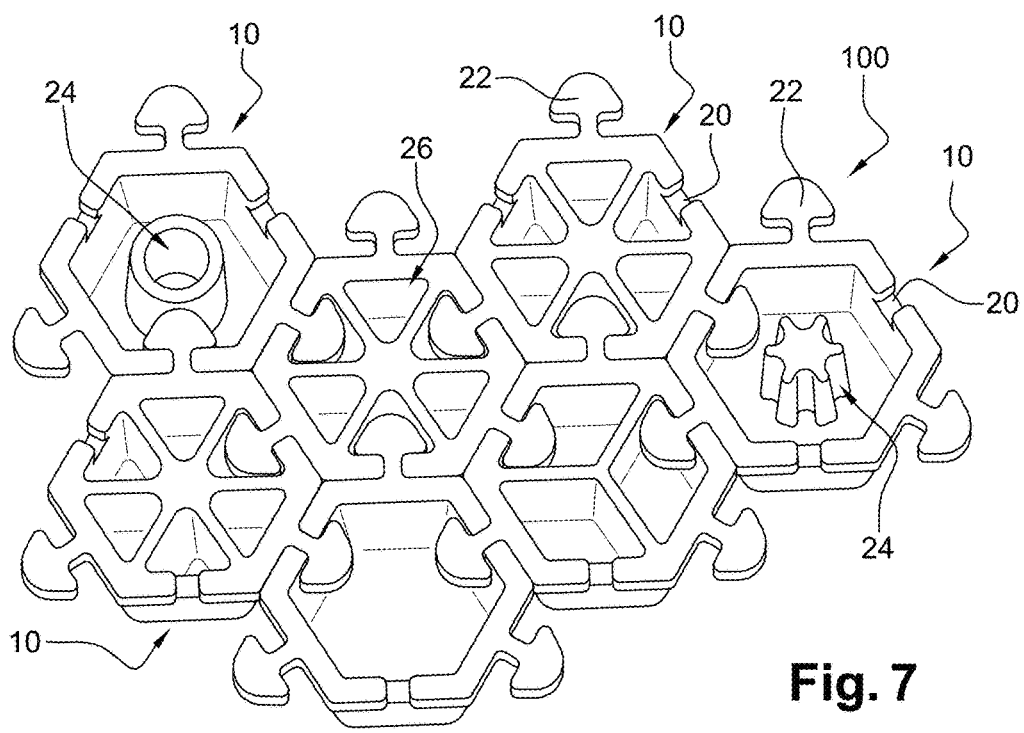
Fig. 7
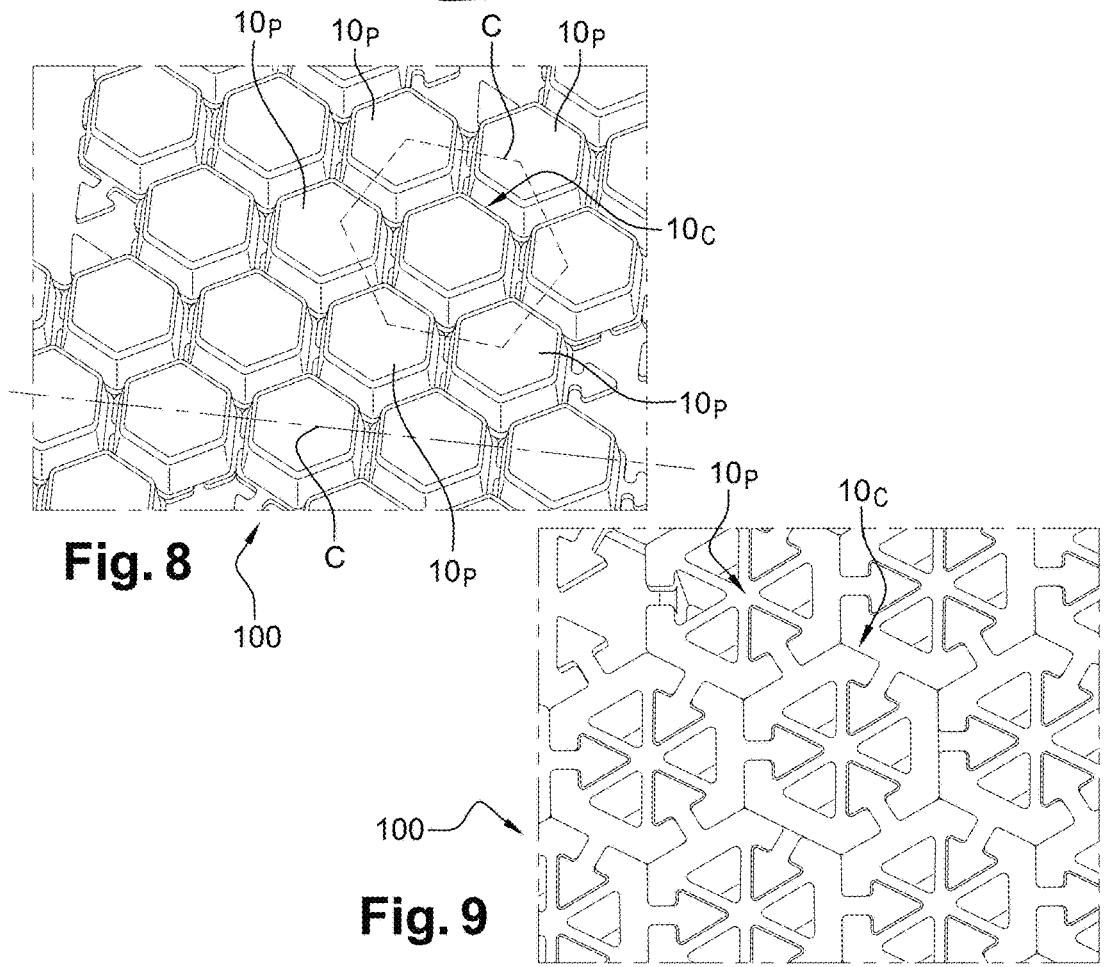
Fig. 8
Fig. 9

FLEXIBLE MODULAR ABSORPTION PANEL AND BLOCK FOR PRODUCING SUCH A PANEL

TECHNICAL FIELD OF THE INVENTION

The invention relates to a flexible modular panel for absorbing shocks and/or vibrations, and to an individual block for manufacturing a flexible modular panel of this kind.

The invention relates more particularly to a flexible modular panel of the type which is delimited by a horizontal upper "impact" face capable of receiving an impact or a vibratory wave to be absorbed, and by a lower opposing surface which is parallel to the upper face.

A flexible structure of this kind, having a low thickness between the two opposing faces thereof, in particular allows the manufacture of various protection means for the human body.

Protection means of this kind are used, for example, when carrying out various human activities and, for example, for taking part in some sporting activities, such as horse riding, or for motorcycling.

Protection of this kind must fulfil various criteria and European standards, and also fulfil certain ergonomic requirements.

The structure must be as flexible as possible in order to adapt to different shapes of different parts of the human body which it must protect.

Said structure must be modular in order to be able to provide, through assembly, protection means of different shapes and sizes.

The structure must be as lightweight as possible for a specified shock and/or vibration absorption capacity.

Moreover, the protection must allow as much air as possible to circulate through the protective panel in order for use thereof to be as comfortable as possible for the user, in particular in order to avoid excessive perspiration.

PRIOR ART

The protection means currently available on the market do not fulfil all of these requirements, and this is particularly the case for protective panels marketed by the company PORON™, the industrial use of which requires complex cutting, the weight of which is high, and which are "complete" protection means and do not allow any air circulation.

Protection means of the trade mark DAINESE™ are also known, and are very rigid and bulky and are not able to be adapted in three dimensions.

BRIEF SUMMARY OF THE INVENTION

The invention proposes a flexible modular panel for absorbing shocks and/or vibrations, which is delimited by a horizontal upper impact surface and a lower opposing parallel surface, and which is produced by assembling a plurality of adjacent individual absorption blocks, a panel in which:
  each individual block is in the shape of a polyhedral truncated pyramid, hollow at least in part, the base of which is a regular polygon having n sides;
  each individual block is delimited by:
    a horizontal upper impact wall;
    n contiguous vertical lateral walls which are interconnected and connected to said upper wall;
    the n contiguous lateral walls are surrounded by a lower peripheral lip which extends horizontally and radially towards the outside;
    each portion of the lower lip extending along a lateral wall is provided with a tenon or a mortise which are complementary to one another and are arranged so as to allow the assembly of two adjacent individual blocks, in particular by means of interlocking, in the vertical direction, of a tenon and a mortise belonging to one and to the other respectively of said two adjacent individual blocks.

According to other features of the panel:
the polygon is a regular hexagon, and each of the six consecutive portions of the lower lip is provided, alternately, with a tenon or a mortise which are complementary to one another;
the panel comprises at least one sub-assembly formed of six identical individual blocks which are arranged in a regular circular crown shape delimited by eighteen consecutive lateral walls belonging to individual blocks, said lateral walls being surrounded by a lower peripheral lip which extends horizontally towards the outside, each of said eighteen portions of the lower peripheral lip which extends along a lateral wall being provided with a tenon or a mortise which are complementary to one another and are arranged so as to allow the sub-assembly to be assembled to an adjacent individual block and/or to an adjacent sub-assembly;
the sub-assembly comprises a seventh identical individual block arranged in the centre of the sub-assembly;
the individual blocks of the sub-assembly are formed in one piece, and the sub-assembly is delimited by eighteen contiguous vertical lateral walls which are interconnected and connected to a common upper wall, said eighteen contiguous lateral walls being surrounded by a continuous lower peripheral lip which extends horizontally towards the outside;
at least some of said individual blocks and/or sub-assemblies are interconnected by a stitch, acting as a seam, made by hand or by means of a sewing machine;
each individual block and/or each sub-assembly is formed by injection moulding of a thermoplastic material;
the open lower face of at least one individual block and/or at least one sub-assembly is closed by a sewn-on cover;
said thermoplastic material is selected from the group comprising polyamide and polyethylene;
each individual block and/or each sub-assembly comprises at least one internal partition which extends vertically, from the internal face of the upper wall, over the entire height thereof;
each individual block and/or each sub-assembly comprises a plurality of internal partitions arranged in a star shape, each of which partitions extends vertically, from the internal face of the upper wall, over the entire height thereof;
each individual block and/or each sub-assembly comprises at least one foot which extends vertically, from the internal face of the upper wall, over the entire height thereof.

The invention also proposes an individual block for manufacturing a modular panel according to the invention, characterised in that:
the individual block is in the shape of a polyhedral truncated pyramid, hollow at least in part, the base of which is a regular polygon having n sides;
the individual block is delimited by:
  a horizontal upper impact wall;

n contiguous vertical lateral walls which are interconnected and connected to said upper wall;

the n contiguous lateral walls are surrounded by a lower peripheral lip which extends horizontally and radially towards the outside;

each portion of the lower lip extending along a lateral wall is provided with a tenon or a mortise which are complementary to one another and are arranged so as to allow the assembly of two adjacent individual blocks, in particular by means of interlocking, in the vertical direction, of a tenon and a mortise belonging to one and to the other respectively of said two adjacent individual blocks.

BRIEF DESCRIPTION OF THE DRAWINGS

Other features and advantages of the invention will become apparent upon reading the detailed description which follows, and for the understanding of which reference will be made to the accompanying drawings, in which:

FIG. 7 is a schematic view from below of a flexible modular panel produced by assembling individual blocks of the type shown in FIGS. 1 and 4 to 6;

FIG. 8 is a schematic view from below of a part of a modular panel obtained by assembling a plurality of individual blocks of the type shown in FIG. 1;

FIG. 9 is a view from below of FIG. 8;

DETAILED DESCRIPTION OF THE DRAWINGS

Figure 1:
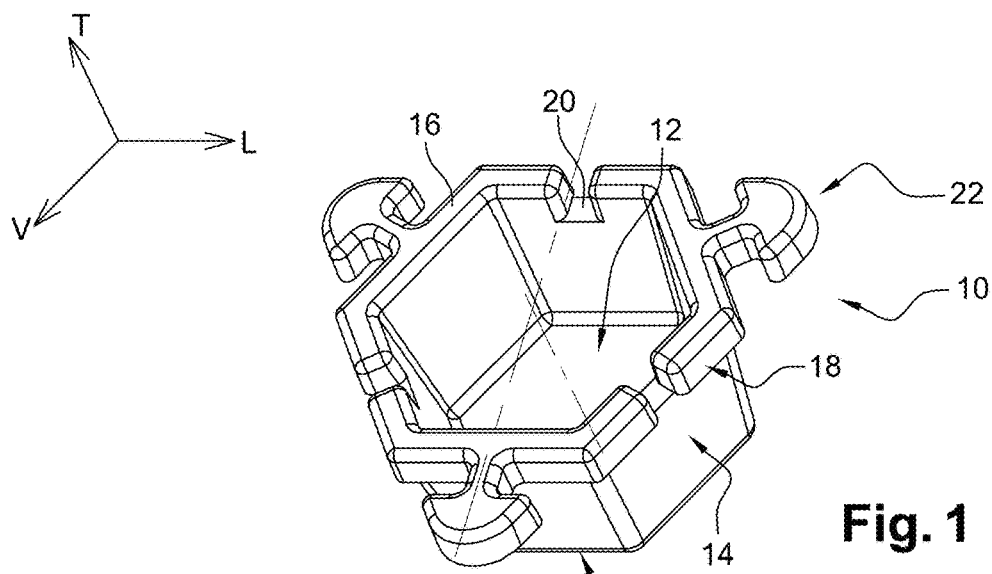
FIG. 1 is a perspective view from below of a first embodiment of an individual block according to the invention.
Figure 2:
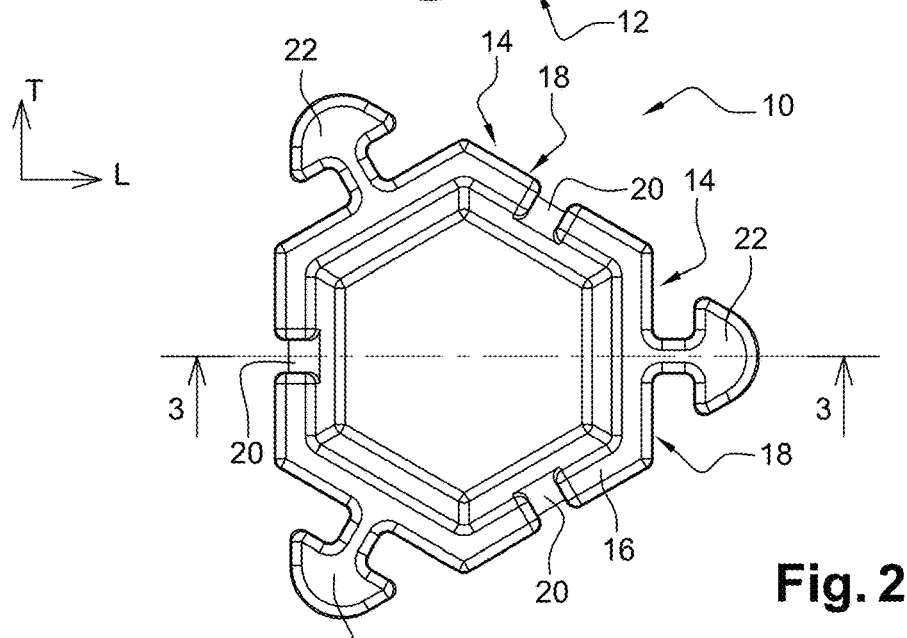
FIG. 2 is a view from below of the block of FIG. 1.
Figure 3:
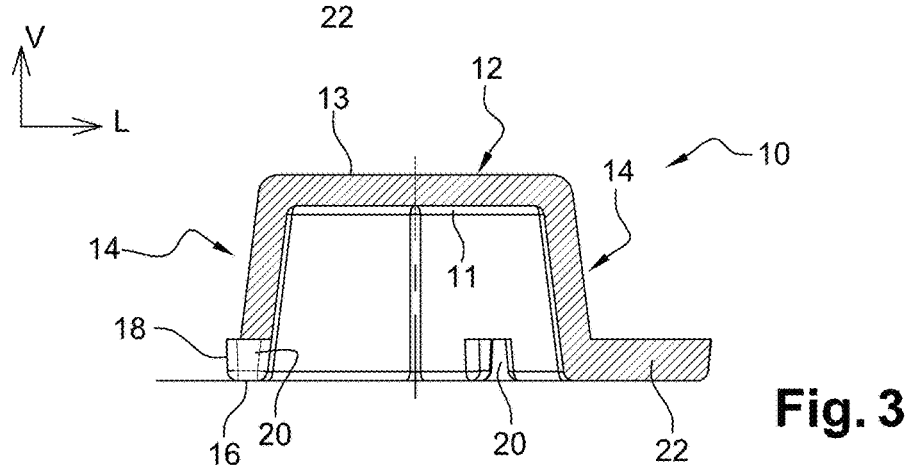
FIG. 3 is a cross section along the line 3-3 of FIG. 2.

In the description which follows, the terms horizontal, vertical, upper, lower, etc. will be used in a non-limiting manner and by way of example, without reference to the Earth's gravity, but with reference to the trihedral L, V, T shown in the drawings.

Identical, analogous or similar elements and components will be denoted by the same reference signs.

FIG. 1 shows an individual block 10 which is an element in the shape of a polyhedral truncated pyramid, the base of which is here a regular hexagon.

The block 10 is produced by moulding, in one piece, a thermoplastic material.

The block 10 is vertically delimited upwards by a horizontal upper wall 12, known as an impact wall, having a hexagonal contour, the external upper face or surface 13 of which forms part of the horizontal upper impact surface of a panel formed by assembling individual blocks 10.

Here, the block 10 comprises six lateral walls 14 of generally vertical orientation, said walls being contiguous and continuous and being interconnected and connected to the upper wall 12.

The block 10 is thus in the form of a generally hollow element which is vertically delimited at the bottom by the lower horizontal edges 16 of the lateral walls 14.

Close to the lower end thereof, each vertical wall 14 extends horizontally and radially towards the outside, via a lip 18. The peripheral lip 18 thus comprises six consecutive portions, each of which corresponds to a vertical lateral wall 14, the six consecutive portions associated with the lateral walls 14 forming a continuous peripheral lip which surrounds the block 10 at the base thereof.

Alternatively, each portion of the lower lip 16 comprises either a mortise 20 or a tenon 22.

The tenons 22 and mortises 20 are complementary to one another so as to allow assembly, as will be explained below, of a panel by means of interlocking the tenons 22 and mortises 20 of a plurality of adjacent blocks 10.

Within the meaning of the invention, tenon means a male connector or a male connection element which, here, is a male connection or assembly element in a general T-shape, whereas mortise means a female connector or a female connection element which, here, is a connection or assembly slot which extends radially through the entire radial thickness of the lip 18 in order to receive and lock a male connection element or tenon 22.

Figure 4:
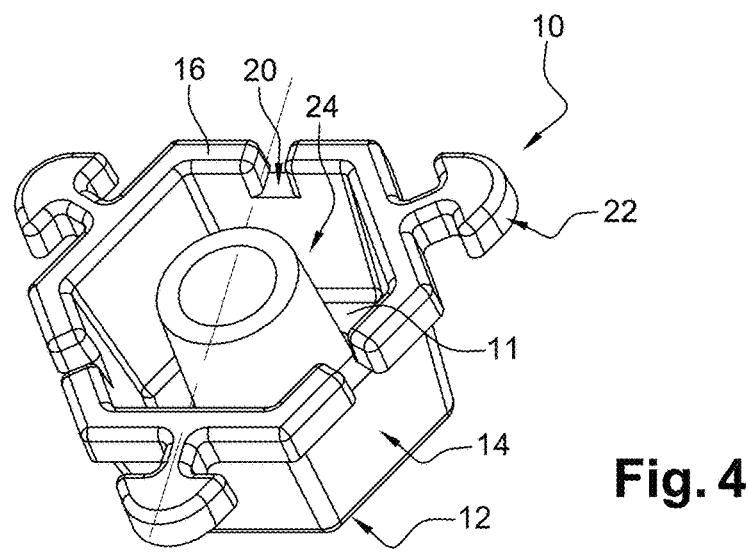
FIGS. 4, 5 and 6 are views similar to that of FIG. 1, showing three variants of the individual block shown in FIG. 1.

In the first variant shown in FIG. 4, the individual block 10 comprises an internal central foot 24 which, here, has the general form of a hollow tube and which extends vertically over the entire height of the block 10, from the internal face 11 of the horizontal upper wall 12 up to the plane of the lower face 16 of the block 10.

The vertical foot 24 may be of any shape or cross section, and may also be filled, as shown in the right-hand part of FIG. 7.

Figure 10:
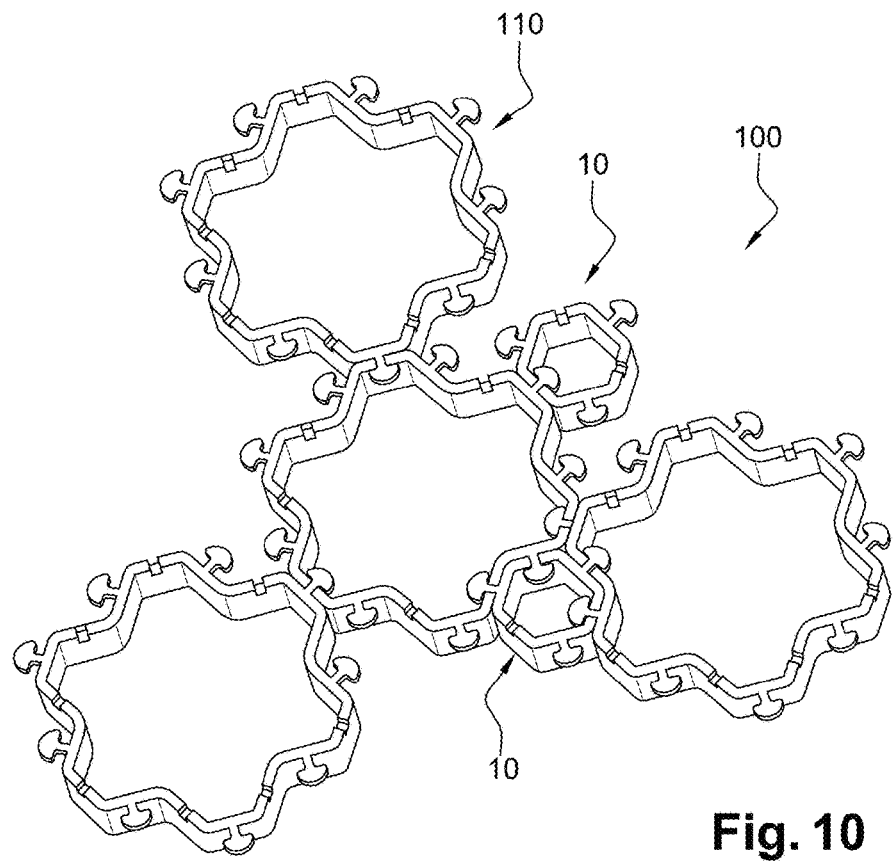
FIG. 10 is a variant of the invention in which the sub-assembly is in the shape of a crown or rosette, having the central block thereof, and is formed in one piece, and the assembly of a plurality of said sub-assemblies to individual blocks.

It is also possible to provide a plurality of vertical feet within the same individual block 10, or inside the same sub-assembly, as shown in FIG. 10.

Figure 5:
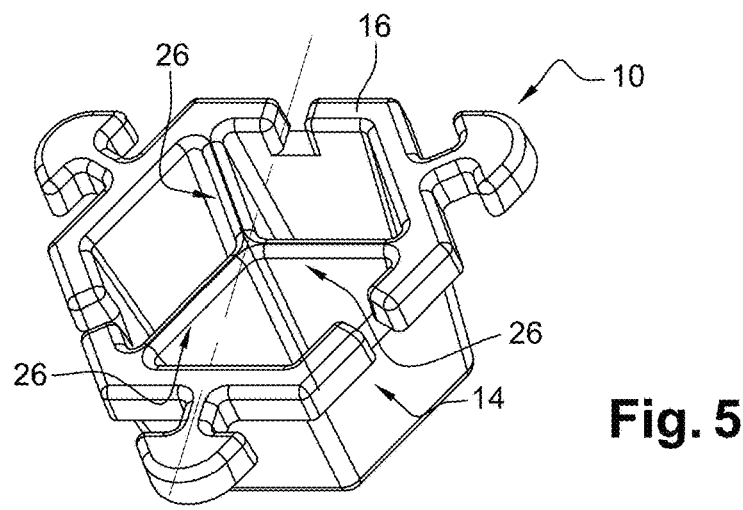

In the variant shown in FIG. 5, the individual block 10 here comprises a series of three internal partitions 26 which are centrally arranged in a star shape.

Each internal partition 26 extends vertically across the entire height of the block 10 and radially from the centre to the periphery and, here, up to one of the angles or summits delimited by two consecutive vertical lateral walls 14.

Figure 6:
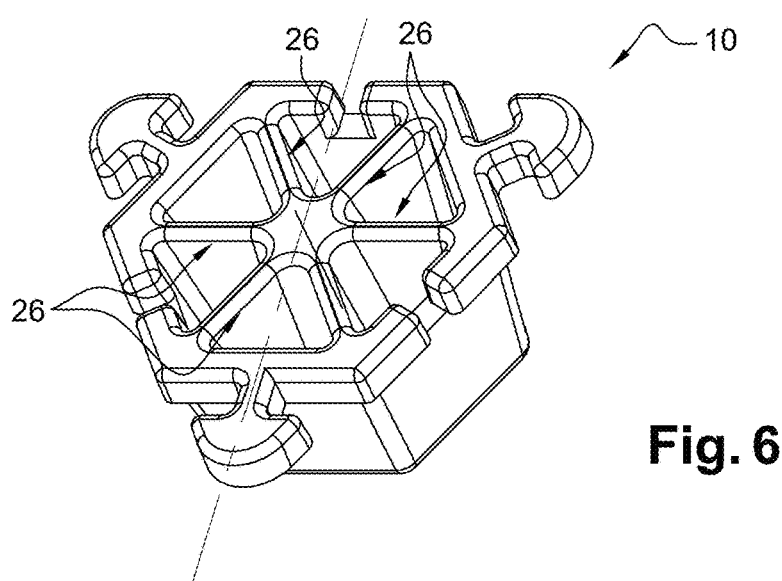

In the variant shown in FIG. 6, the individual block comprises, here, six internal partitions 26 which are radially arranged in a star shape and which connect the six angles or summits of the individual block 10.

Walls 26 may also be provided inside a sub-assembly, as shown in FIG. 10.

As can be seen in FIG. 7, it is possible to produce a panel 100 by assembling a plurality of individual unit blocks 10, each of which forms a modular element of the panel.

Assembly takes place, after selecting the number of blocks to be assembled and choosing the geometric positioning thereof, by interlocking the tenons 22 in the mortises 20.

The tenons and mortises may be dimensioned such that the interlocking takes place in the form of a resilient interlocking, in such a way that, once assembled, the blocks are already interconnected in order to allow manipulation of an assembled modular panel 100.

As will be explained below, assembly is completed by stitches.

As a result of the modular structure created by means of assembling neighbouring or adjacent individual blocks 10, there is always clearance between two adjacent lateral faces of the lip portions of two adjacent blocks, thus allowing air to circulate.

The design according to the invention allows great flexibility of "hinging" between the different blocks 10, and thus great adaptability to the shape of the surface facing which a panel 100 must be arranged, for example in order to protect a part of the human body.

As can be seen with reference to FIGS. 8 and 9, a "central" individual block 10c is surrounded by a sub-assembly of six peripheral blocks 10p which form a crown or rosette around the central block 10c.

The sub-assembly thus formed by the crown of six peripheral individual blocks 10c may be assembled to other adjacent or neighbouring sub-assemblies, the only spaces then remaining between two adjacent crowns possibly being individually filled by an additional individual block 10.

In order to produce a sub-assembly, together with or without the central block 10c thereof, following assembly by interlocking it is possible to interconnect the six peripheral blocks 10c, for example by sewing them together by means of a stitch "C", or to form them in one piece, as will be further explained.

A stitch C acts as a seam and can be produced by hand or by means of a sewing machine, in order to form a hinged connection between adjacent or neighbouring blocks &à, 10c, 10d and/or sub-assemblies in order to form a modular panel 100.

The stitch C is preferably made on the external upper face 13 of the horizontal upper walls 12.

Each stitch may be of any shape or contour, depending on the assemblies and panels to be produced.

FIG. 10 shows a variant in which a sub-assembly 110, previously formed of six individual blocks 10p arranged in a crown shape and of a complementary central block 10c, is formed here in one piece by moulding using thermoplastic material.

Thus, a modular element in the shape of a crown or rosette is provided, the peripheral wall of which is formed by eighteen consecutive and contiguous vertical walls, each of which comprises, in the lower lip portion thereof, a tenon or a mortise 20 alternately.

A panel 100 is thus formed by assembling individual blocks 10 and/or sub-assemblies 110 depending on the panel to be produced, said components of course being rigidly connected in a complementary manner by stitches or seams which are not shown.

Figure 11:
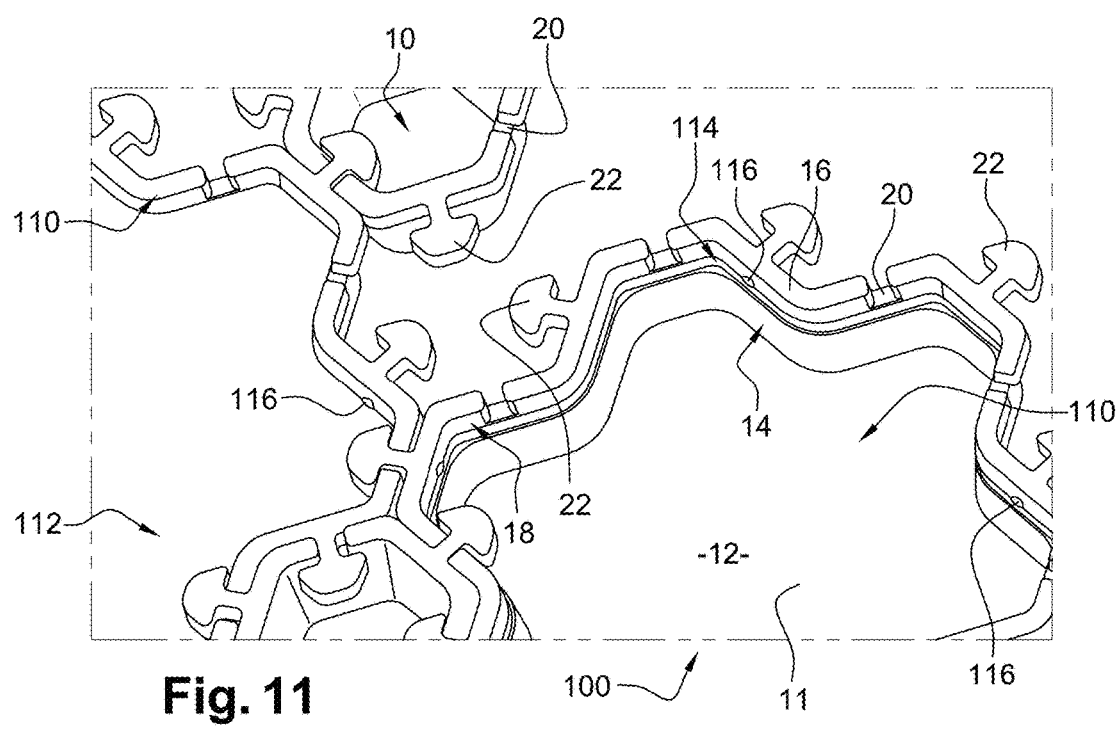
FIG. 11 is a larger-scale detail of FIG. 10, in which a cover for closing the sub-assembly is also shown.

As can be seen in FIG. 11, a modular sub-assembly 110 may be closed, at the lower part thereof, by a lower cover 112 produced from any appropriate material, which is more or less rigid and which is attached, by interlocking, in a groove 114 formed for this purpose on the inside of the vertical lateral walls 14 and below the peripheral lip 18, having pins 116 for locking the cover 112 in position.

The cover 112 may comprise one or more holes to allow the passage of air.

The cover 112 may also be a filled element which is moreover attached, for example by adhesion, in a sealed manner in order to enclose inside the sub-assembly 110 or, in the same way, inside an individual block 10 comprising a cover of this kind, a fluid such as air or any other gaseous fluid or liquid having, for example, specific capabilities or abilities which improve or modify the absorption of the modular panel.

In the case of industrial production, if it is desired to "fill" the blocks 10 and sub-assemblies 110 with a liquid, the sealed closing means may be formed not by one or more related covers 112 but by a layer of material capable of setting which is made to flow over the volume of liquid previously poured into said components.

Each of the components, blocks or sub-assemblies is preferably formed by moulding in a thermoplastic material selected from the group comprising polyamide, polyethylene, etc.

The invention claimed is:

1. A flexible modular panel for absorbing shocks and/or vibrations, which is delimited by a horizontal upper impact surface and a lower parallel opposing surface, the panel comprising:
   an assembly of a plurality of adjacent individual absorption blocks,
      each individual block being in a shape of a polyhedral truncated pyramid, hollow at least in part, a base of which is a regular polygon having n sides, and
      each individual block being delimited by a horizontal upper impact wall, and n contiguous vertical lateral walls which are interconnected and connected to said horizontal upper impact wall, the n contiguous lateral walls being surrounded by a lower peripheral lip which extends horizontally and radially towards the outside, the individual block being provided with at least one tenon and at least one mortise, each portion of the lower lip extending along one of the lateral walls being provided with one of the at least one tenon or one of the at least one mortise which are complementary to one another and are arranged to allow the assembly of two adjacent individual blocks, by interlocking, in the vertical direction, of a tenon of the at least one tenon and a mortise of the at least one mortise respectively belonging to one adjacent individual block and to another adjacent individual block.

2. The panel according to claim 1, wherein said polygon is a regular hexagon, and
   wherein each of six consecutive portions of the lower lip is provided, alternately, with the one of the at least one tenon or the one of the at least one mortise which are complementary to one another.

3. The panel according to claim 2, further comprising at least one sub-assembly formed of six identical individual blocks which are arranged in a regular circular crown shape delimited by eighteen consecutive lateral walls belonging to individual blocks, said eighteen consecutive lateral walls being surrounded by the lower peripheral lip which extends horizontally towards the outside, each of said eighteen portions of the lower peripheral lip which extends along a corresponding one of the lateral walls being provided with the one of the at least one tenon or the one of the at least one mortise which are complementary to one another and are arranged to allow the sub-assembly to be assembled to an adjacent individual block and/or to an adjacent sub-assembly.

4. The panel according to claim 2, wherein at least some of said individual blocks and/or sub-assemblies are interconnected by a stitch, acting as a seam, made by hand or by a sewing machine.

5. The panel according to claim 2, wherein each individual block and/or each sub-assembly is formed by injection molding of a thermoplastic material.

6. The panel according to claim 3, wherein said sub-assembly comprises a seventh identical individual block arranged in a center of the sub-assembly.

7. The panel according to claim 3, wherein at least some of said individual blocks and/or sub-assemblies are interconnected by a stitch, acting as a seam, made by hand or by a sewing machine.

8. The panel according to claim 3, wherein each individual block and/or each sub-assembly is formed by injection molding of a thermoplastic material.

9. The panel according to claim 6, wherein the individual blocks of the sub-assembly are formed in one piece, and
   wherein said sub-assembly is delimited by eighteen contiguous vertical lateral walls which are interconnected and connected to a common upper wall, said eighteen contiguous lateral walls being surrounded by the lower peripheral lip which is continuous and extends horizontally towards the outside.

10. The panel according to claim 6, wherein at least some of said individual blocks and/or sub-assemblies are interconnected by a stitch, acting as a seam, made by hand or by a sewing machine.

11. The panel according to claim 6, wherein each individual block and/or each sub-assembly is formed by injection molding of a thermoplastic material.

12. The panel according to claim 9, wherein at least some of said individual blocks and/or sub-assemblies are interconnected by a stitch, acting as a seam, made by hand or by a sewing machine.

13. The panel according to claim 1, wherein at least some of said individual blocks and/or sub-assemblies are interconnected by a stitch, acting as a seam, made by hand or by a sewing machine.

14. The panel according to claim 1, wherein each individual block and/or each sub-assembly is formed by injection molding of a thermoplastic material.

15. The panel according to claim 14, wherein the open lower face of at least one individual block and/or at least one sub-assembly is closed by a sewn-on cover.

16. The panel according to claim 14, wherein said thermoplastic material is selected from the group comprising polyamide and polyethylene.

17. The panel according to claim 1, wherein each individual block and/or each sub-assembly comprises at least one internal partition which extends vertically, from an internal face of the upper wall, over the entire height thereof.

18. The panel according to claim 1, wherein each individual block and/or each sub-assembly comprises a plurality of internal partitions arranged in a star shape, each of the internal partitions extending vertically, from an internal face of the upper wall, over the entire height thereof.

19. The panel according to claim 1, wherein each individual block and/or each sub-assembly comprises at least one foot which extends vertically, from an internal face of the upper wall, over the entire height thereof.

20. A block for manufacturing a flexible modular panel for absorbing shocks and/or vibrations, which is produced by assembling a plurality of adjacent individual absorption blocks,
   wherein the individual block is in a shape of a polyhedral truncated pyramid, hollow at least in part, a base of which is a regular polygon having n sides, and
   the individual block is delimited by a horizontal upper impact wall, and n contiguous vertical lateral walls which are interconnected and connected to said horizontal upper impact wall, the n contiguous lateral walls being surrounded by a lower peripheral lip which extends horizontally and radially towards the outside, the individual block being provided with at least one tenon and at least one mortise, each portion of the lower lip extending along one of the lateral walls being provided with one of the at least one tenon or one of the at least one mortise which are complementary to one another and are arranged to allow the assembly of two adjacent individual blocks, by interlocking, in the vertical direction, of a tenon of the at least one tenon and a mortise of the at least one mortise respectively belonging to one adjacent individual block and to another of adjacent individual block.

* * * * *